United States Patent [19]
Kohn

[11] 4,452,639
[45] Jun. 5, 1984

[54] BENZOQUINONE ETHER ADDUCT OF POLYGALACTOMANNAN GUM

[75] Inventor: Rachel S. Kohn, Springfield, N.J.

[73] Assignee: Celanese Corporation, New York, N.Y.

[21] Appl. No.: 441,715

[22] Filed: Nov. 15, 1982

[51] Int. Cl.$^3$ .................. C08L 5/00; C08G 59/40
[52] U.S. Cl. .................................. 106/205; 106/208; 536/18.6; 536/114
[58] Field of Search ............... 106/205, 208; 536/18.6, 536/114

[56] References Cited
U.S. PATENT DOCUMENTS 3,912,713 10/1975 Boonstra .......................... 106/205
4,183,765 1/1980 Podlas ............................. 106/187

*Primary Examiner*—Theodore Morris
*Attorney, Agent, or Firm*—Depaoli & O'Brien

[57] ABSTRACT

This invention provides a viscoelastic aqueous solution which contains a novel benzoquinone ether adduct of polygalactomannan gum as a thickening agent.

An invention thixotropic aqueous medium is characterized by excellent heat stability and high tolerance to the presence of inorganic salts.

A unique property of an invention thixotropic aqueous medium is a time-dependent gradual restoration of high viscosity after cessation of high shear deformation.

20 Claims, 2 Drawing Figures

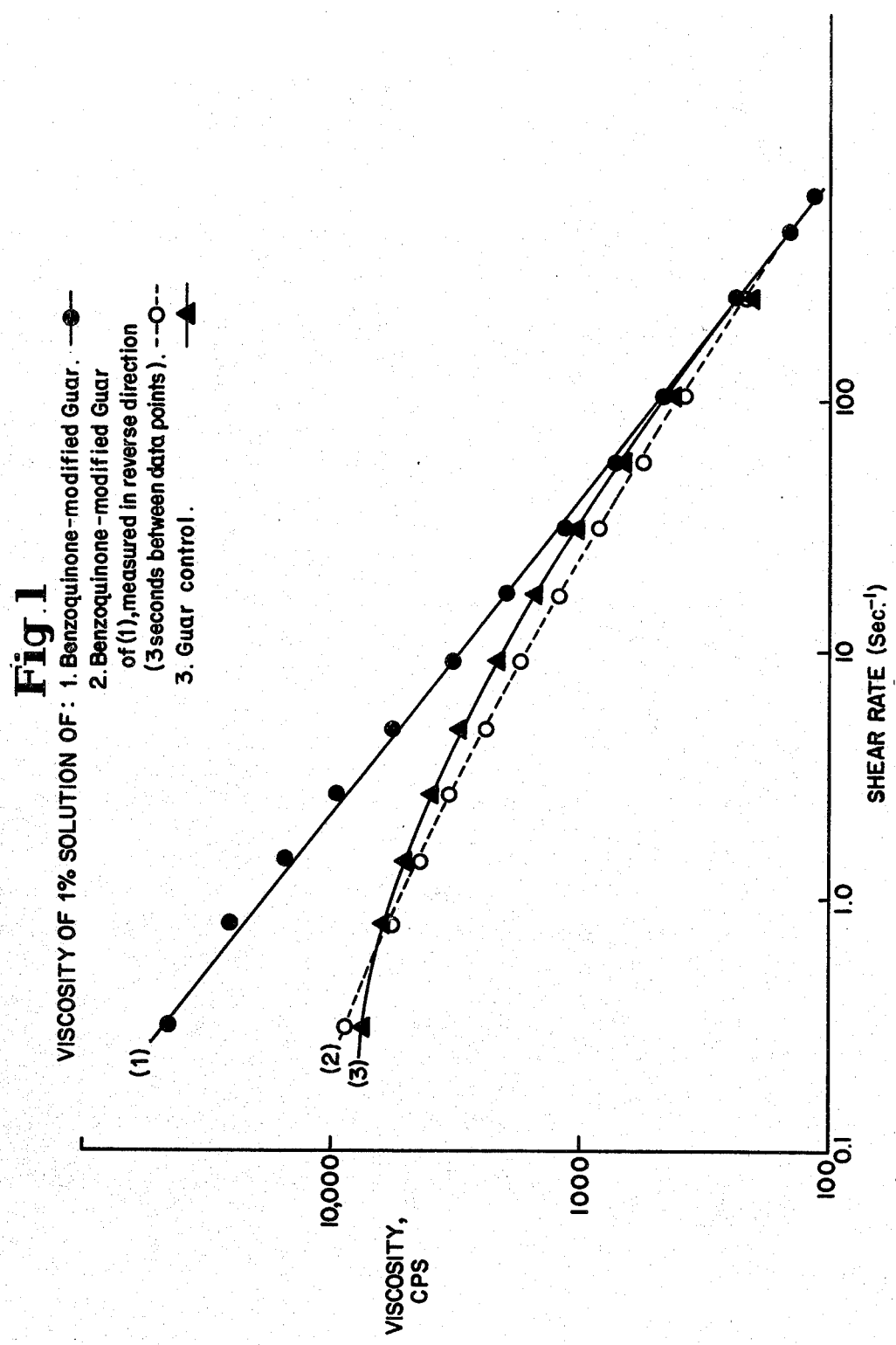

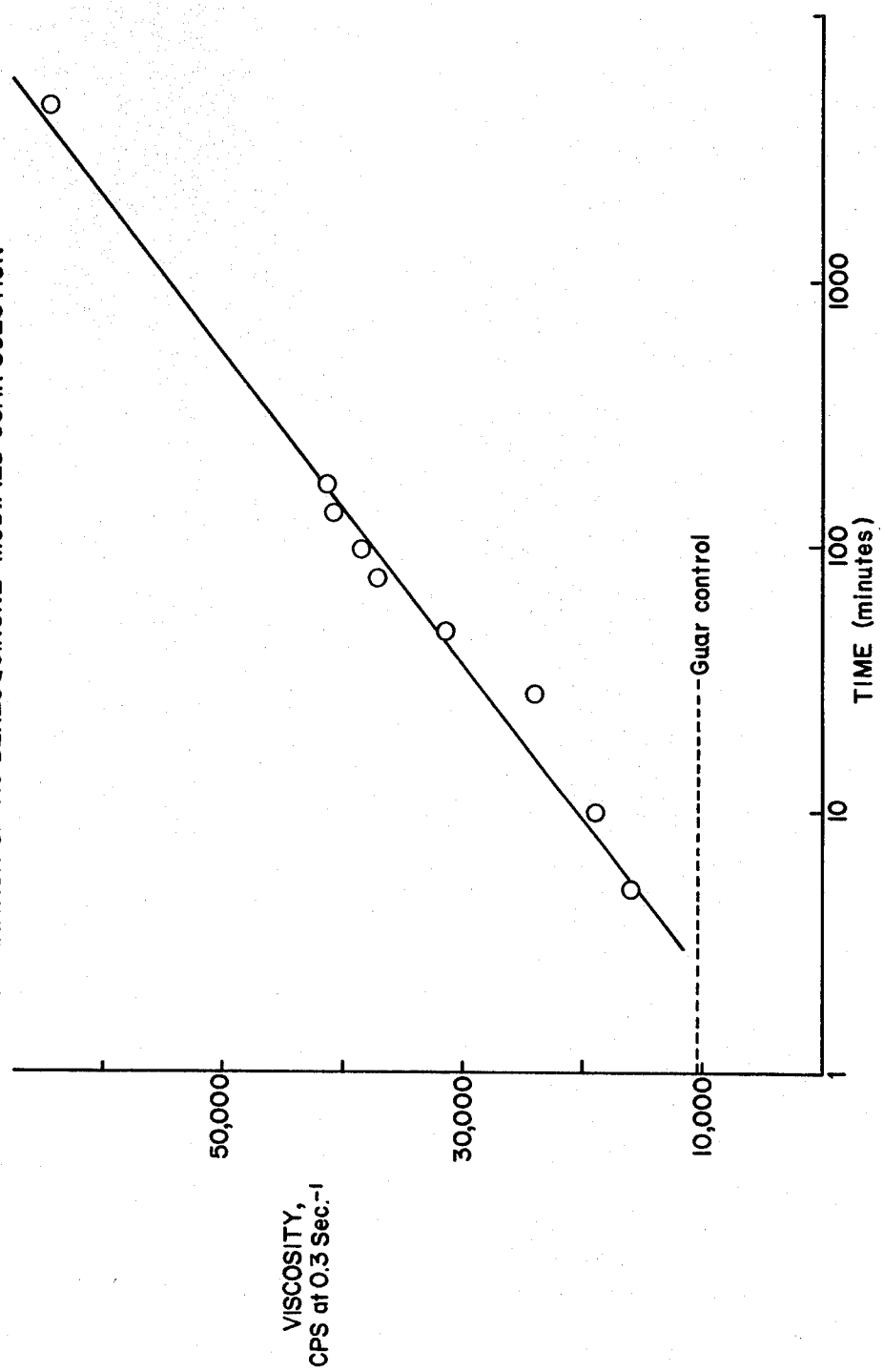

BENZOQUINONE ETHER ADDUCT OF POLYGALACTOMANNAN GUM

BACKGROUND OF THE INVENTION

Many liquid media possess a certain amount of elasticity and tensile strength, and are classified as viscoelastic materials. Some liquid media are characterized by pronounced elasticity and high tensile strength, and exhibit unique characteristics during laminar flow, i.e., superelastic liquids.

One characteristic of superelastic liquids is a tendancy to recoil when deforming forces acting on them are removed, and the potential energy stored in the liquids as a result of deforming forces is converted into kinetic energy. Another unique characteristic of superelastic liquid media is the ability to build up resistance to deformation as shear stresses increase and to flow readily at shear stresses about certain values.

It has been found that these and other properties qualify such liquid media as particularly useful for controlling lost circulation in oil field drilling operations and in related applications.

The superelastic liquids which have the greatest utility are those prepared by crosslinking water-soluble polymers in aqueous solution. It has been found that polysaccharidic hydrocolloids can be crosslinked in aqueous solution to produce viscous liquid media which are highly elastic and have considerable tensile strength.

U.S. Pat. No. 2,968,581 describes a method of crosslinking polymeric polyhydroxy materials which involves reacting the said materials in the presence of water with a preformed polymeric acetal.

U.S. Pat. Nos. 3,214,235 describes the production of crosslinked derivatives of polyhydroxy compounds by reaction with a diester of propiolic acid.

U.S. Pat. Nos. 3,215,634 describes the preparation of superelastic liquids which involves reacting an aqueous solution of a polysaccharide with a crosslinking agent which yields borate ions in aqueous solution. An acyclic $C_2$-$C_5$ polyhydric alcohol is added in a concentration sufficient to react with excess borate ions and stabilize the crosslinked polysaccharide.

U.S. Pat. No. 3,697,498 describes a novel crosslinking agent for use with aqueous solutions of polysaccharides to form enhanced shear rate thinning viscoelastic solutions, wherein the said crosslinking agent consists essentially of a chelating composition formed from an organic polyelectrolyte ligand component, and a compound of a metal of the first series of the transition elements of the Periodic Table.

U.S. Pat. No. 3,836,465 describes a viscoelastic hydraulic fluid composition comprising an aqueous medium containing a mixture of polyalkylene oxide and lignosulfonate salt.

U.S. Pat. No. 4,183,765 describes a method of increasing the viscosity of a hydroxyalkyl cellulose solution by treatment with benzoquinone under controlled pH conditions.

The various non-Newtonian viscoelastic solutions of the type reviewed above usually are characterized by one or more disadvantages which limit their applicability in important commercial operations, e.g., for use as hydraulic fluid vehicles in well-drilling and in secondary oil and gas recovery from subterranean formations.

One disadvantage is that some high viscosity solutions are not sufficiently thixotropic in relation to low and high shear rates.

Another disadvantage is that with some methods of thickening aqueous solutions there is not sufficient control over the attainment and maintenance of the desired viscosity range and properties.

Another disadvantage of some viscoelastic solutions is an intolerance to the presence of inorganic electrolytes.

A further disadvantage of some viscoelastic solutions is a sensitivity to temperatures above about 60° C., and a consequential degradation of rheological properties.

Accordingly, it is an object of this invention to provide a process for improving the viscoelastic properties of an aqueous medium.

It is another object of this invention to provide a novel thickening agent adapted to impart thixotropic properties to an aqueous medium.

It is another object of this invention to provide a thixotropic aqueous solution which exhibits improved heat stability and tolerance to the presence of inorganic electrolytes.

It is a further object of this invention to provide a process for derivatizing polygalactomannan gum contained in leguminosae endosperm splits.

Other objects and advantages of the present invention shall become apparent from the accompanying description and examples.

BRIEF DESCRIPTION OF THE DRAWINGS

FIG. 1 illustrates the relationship of viscosity and shear rate of benzoquinone-modified guar and a control of unmodified guar gum.

FIG. 2 illustrates the delay in high viscosity restoration of benzoquinone-modified guar gum.

DESCRIPTION OF THE INVENTION

One or more objects of the present invention are accomplished by the provision of a process for increasing the viscosity of an aqueous solution of polygalactomannan gum having a pH of at least about 6.0, which comprises adding between about 0.1–10 weight percent, based on the weight of polygalactomannan gum, of benzoquinone to the aqueous solution.

In another embodiment, the present invention provides a dry blend composition adapted for application as a thickening agent in aqueous solutions which comprises (1) polygalactomannan gum, and (2) between about 0.1–10 weight percent, based on the weight of polygalactomannan gum, of benzoquinone.

In another embodiment, the present invention provides a solid composition comprising particulate benzoquinone ether adduct of polygalactomannan gum.

In another embodiment, the present invention provides a solid composition comprising leguminosae endosperm splits containing a benzoquinone ether adduct of polygalactomannan gum, and further provides a process for preparing the said solid composition which comprises treating the endosperm splits with an aqueous solution of benzoquinone at a pH of at least about 7.5.

In a further embodiment, the present invention provides a thixotropic aqueous solution of a polygalactomannan gum ether derivative, wherein a 1.0 weight percent aqueous solution of the gum exhibits a viscosity of 10,000–100,000 centipoises at a shear rate of 0.3 reciprocal seconds, a viscosity of 3000–10,000 centipoises at a shear rate of 5 reciprocal seconds, and a viscosity of 50-300 centipoises at a shear rate of 500 reciprocal seconds, and wherein the solution has the ability to recover the low-shear high-viscosity state over an elapsed time period (e.g., over a period between about 0.1-5 hours as illustrated in FIG. 2).

Whenever the following description refers specifically to guar gum, it is understood that the disclosure is applicable to the other closely related polygalactomannan gums in general, and locust bean gum in particular.

The term "polygalactomannan gum" as employed herein is meant to include derivatives of polygalactomannan gum in general, and ether derivatives of polygalactomannan gum in particular. Illustrative of ether derivatives are hydroxyalkyl derivatives and carboxyalkyl derivatives of polygalactomannan gum having a degree of substitution between about 0.1-1.5.

By the term "degree of substitution" as employed herein is meant the average substitution of groups (e.g., ether groups) per anhydro sugar unit in the polygalactomannan gums. In guar gum, the polymer consists of a chain of mannose units wit a beta-1,4 glycosidic linkage, and a galactose unit is attached to a hydroxyl group of a mannose unit by an alpha-1,6 linkage, in a ratio of about one galactose unit per two mannose units. On the average, each of the anhydro sugar units contains three available hydroxyl sites. A degree of substitution of three would mean that all of the available hydroxy sites have been substituted with ether groups.

Preferred types of polygalactomannan gums for application as a component of the invention viscoelastic compositions include guar gum and locust bean gum. Other preferred types of polygalactomannan gums are the hydroxyalkyl ether and carboxyalkyl ether derivatives which have a degree of substitution between about 0.1 and 1.5, and which have an alkyl group containing between 1 and about 6 carbon atoms, e.g., hydroxyethyl ether and carboxymethyl ether derivatives of guar gum.

Etherification of polygalactomannan gums can be accomplished with polygalactomannan gums in the form of finely divided powders or in the form of gum "splits".

Guar gums and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. Nos. 2,891,050; 3,455,899; and references cited therein.

Hydroxyalkyl ethers of polygalactomannan gums are readily prepared by the reaction of a polygalactomannan gum with an alkylene oxide containing between 1 and about 6 carbon atoms, e.g., ethylene oxide, propylene oxide, butylene oxide, hexylene oxide and the like.

The reaction of a polygalactomannan gum and an alkylene oxide is conveniently conducted at a temperature between about 20° C. and 100° C. and a pressure between about 15 and 150 psi, in a solvent medium in the presence of an alkaline catalyst such as sodium hydroxide or calcium hydroxide. Suitable solvent media include water, cyclic and acyclic alkyl ethers, alkanones, hydrocarbons, dialkylformamide, and the like, and mixtures thereof. Illustrative of useful organic solvents are pentane, acetone, methylethylketone, diethylketone, tetrahydrofuran, dioxane and dimethylformamide.

Employing similar conditions as recited above, carboxyalkyl ether derivatives are prepared by the reaction of a polygalactomannan gum with a monochloroalkanoic acid in a strongly alkaline medium, e.g., the reaction of chloroacetic acid with guar gum yields carboxymethyl ether of guar gum.

A thickened aqueous solution in accordance with the present invention has unique viscoelastic properties which appear to be attributable to a low degree of cross-linking effected between polygalactomannan gum molecules by reaction with benzoquinone via a Michael-type addition mechanism under alkaline conditions:

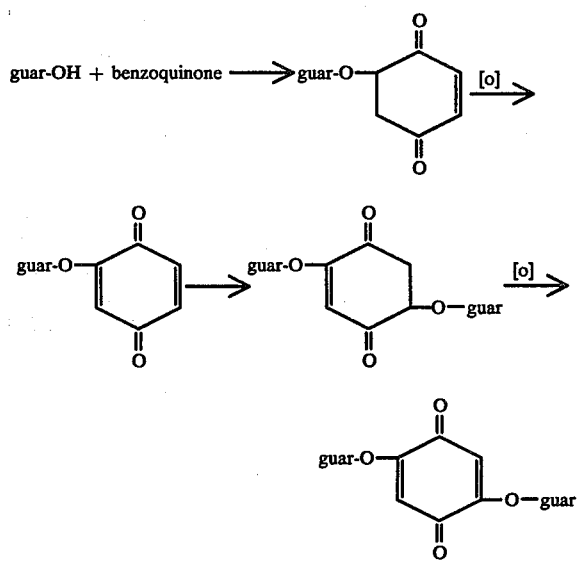

The presence of benzoquinone can function as an oxidation reagent for the secondary conversion indicated in the reaction diagram.

The reaction between polygalactomannan gum and benzoquinone is pH sensitive. The pH must be at least about 6.0, and the pH is preferably in the alkaline range between about 7-10, and most preferably is at least about 7.5.

The polygalactomannan gum and benzoquinone being reacted to form the desired benzoquinone ether adduct of polygalactomannan gum are employed in quantities between about 0.1-2 weight percent, based on the weight of aqueous medium, of polygalactomannan gum; and between about 0.1-10 weight percent, based on the weight of polygalactomannan gum, of benzoquinone.

Under aqueous alkaline conditions, the reaction between polygalactomannan gum and benzoquinone proceeds readily at room temperature to form the benzoquinone-modified polygalactomannan gum, i.e., the benzoquinone ether adduct of polygalactomannan gum with a low degree of crosslinking between polygalactomannan gum molecules. It is believed that there is also present an annular type of macromolecule which is formed by a difunctional Michael addition between one polygalactomannan gum molecule and one benzoquinone molecule.

An aqueous solution of polygalactomannan gum (e.g., 1.0 weight percent) will increase in viscosity to about 10,000–100,000 centipoises when the aqueous solution is treated with benzoquinone (e.g., 1–3 weight percent based on gum) under alkaline pH conditions.

An aqueous medium (e.g., a hydraulic fluid) which is thickened with a present invention benzoquinone-modified polygalactomannan gum exhibits unique viscoelastic properties not previously evident in known aqueous media thickened with a polygalactomannan gum either alone or in combination with other organic or inorganic gelling ingredients.

A present invention high viscosity aqueous solution is thixotropic, heat stable at temperatures up to about 80° C., and exhibits a high degree of tolerance for the presence of inorganic electrolytes such as sodium chloride.

There is a significant distinction between the thixotropic nature of a present invention viscoelastic aqueous solution and that of a conventional viscoelastic aqueous medium. As illustrated in FIG. 1, a present invention thixotropic solution does not regain its original high viscosity upon diminution of high shear deformation as does a control solution thickened with guar gum. Instead, the viscosity of the invention solution remains at a low level after a half hour even at a shear rate as low as 0.3 reciprocal seconds.

This delay in high viscosity restoration of an invention solution is further demonstrated in FIG. 2, where it is shown that an invention solution upon relaxation after high shear stirring slowly and continuously regains its original high viscosity as a function of time. This exceptional property of a present invention viscoelastic aqueous solution is highly advantageous for purposes of transport through an extensive conduit system.

The following Example is further illustrative of the present invention. The catalysts and other specific ingredients and processing parameters are presented as being typical, and various modifications can be derived in view of the foregoing disclosure within the scope of the invention.

EXAMPLE

An aqueous solution of benzoquinone (2.0 weight percent, based on guar gum weight, dissolved in a minimum of hot water) is added to a 1.0 weight percent aqueous solution of guar gum.

The resultant solution is treated with dilute aqueous sodium hydroxide to a pH of 8–9, and the treated solution is allowed to stand at room temperature for 15 minutes. The benzoquinone ether adduct formation with the guar gum is terminated by adjusting the solution pH to below 6 with hydrochloric acid.

The guar gum benzoquinone ether adduct product is precipitated with isopropanol, and the precipitate is recovered, dried under vacuum, and redissolved in water at 60° C. in a Waring blender. The new solution (e.g., at a 1.0 weight percent concentration) has the same viscosity range as the original solution before the guar gum benzoquinone ether adduct is precipitated.

The aqueous solution of guar gum benzoquinone ether adduct exhibits a high degree of shear sensitive behavior, as illustrated in FIG. 1.

After vigorous shearing, the immediate low shear viscosity of a 1.0 weight percent solution of benzoquinone-modified guar gum is similar to that of a 1.0 weight percent guar solution, except that the enhanced viscosity property of the benzoquinone-modified guar gum solution begins as soon as the solution is allowed to relax.

As demonstrated in FIG. 2, after ten minutes of relaxing the low shear viscosity of the benzoquinone-modified guar gum is about twice that of the control guar gum solution, and after two hours the viscosity of the benzoquinone-modified guar gum solution is about four times that of the control guar gum solution. The enhanced viscosity appears to recover linearly with the logarithm of time.

The heat stability of a benzoquinone-modified guar solution as compared to a control guar solution is demonstrated by the data listed in the Table. After two hours at 80° C. both solutions lose about 25 percent of the initial viscosity, and after two hours at 120° C. both solutions do not have a measurable viscosity. After two hours at 80° C., the viscosity of the benzoquinone-modified guar gum solution is about three times higher than that of the control guar solution.

Similar viscosity properties as described in this Example are observed if the polygalactomannan gum which is benzoquinone-modified is hydroxypropylguar gum, carboxymethylguar gum, dimethylacrylamide ether adduct of guar gum, or locust bean gum.

TABLE

Heat Stability Of Benzoquinone-modified Guar Gum Solution*

| | Initial | After 2 hours at 80° C. | After 2 hours at 120° C. |
|---|---|---|---|
| Guar Control | 9500 | 7300 | — |
| Modified Guar | 32,000 | 24,000 | — |

*1% solution viscosity (cps) at 0.3 sec$^{-1}$.

What is claimed is:

1. A process for increasing the viscosity of an aqueous solution of polygalactomannan gum having a pH of at least about 6.0, which comprises adding between about 0.1–10 weight percent, based on the weight of polygalactomannan gum, of benzoquinone to the aqueous solution.

2. A process in accordance with claim 1 wherein the solution content of polygalactomannan gum is less than about 3.0 weight percent, based on the solution weight.

3. A process in accordance with claim 1 wherein the polygalactomannan gum is guar gum.

4. A process in accordance with claim 1 wherein the polygalactomannan gum is an ether derivative of guar gum.

5. A process in accordance with claim 1 wherein the polygalactomannan gum is a hydroxyalkyl ether of guar gum.

6. A process in accordance with claim 1 wherein the polygalactomannan gum is a carboxyalkyl ether of guar gum.

7. A process in accordance with claim 1 wherein the pH of the aqueous solution is in the range between about 7–10.

8. A process in accordance with claim 1 wherein the viscosity of the aqueous solution is increased to about 10,000–120,000 centipoises.

9. A dry blend composition adapted for application as a thickening agent in aqueous solutions which comprises (1) polygalactomannan gum, and (2) between about 0.1–10 weight percent, based on the weight of polygalactomannan gum, of benzoquinone.

10. A solid composition comprising particulate benzoquinone ether adduct of polygalactomannan gum.

11. A solid composition in accordance with claim 10 wherein the polygalactomannan gum is guar gum.

12. A solid composition in accordance with claim 10 wherein the polygalactomannan gum is an ether derivative of guar gum.

13. A solid composition comprising leguminosae endosperm splits containing a benzoquinone ether adduct of polygalactomannan gum.

14. A process for preparing a solid composition in accordance with claim 13 which comprises treating the endosperm splits with an aqueous solution of benzoquinone at a pH of at least about 7.5.

15. A thixotropic aqueous solution of a polygalactomannan gum ether derivative, wherein a 1.0 weight percent aqueous solution of the gum exhibits a viscosity of 10,000–120,000 centipoises at a shear rate of 0.3 reciprocal seconds, a viscosity of 3000–10,000 centipoises at a shear rate of 5 reciprocal seconds, and a viscosity of 50–300 centipoises at a shear rate of 500 reciprocal seconds, and wherein the solution has the ability to recover the low-shear high-viscosity state over an elapsed time period.

16. A thixotropic aqueous solution in accordance with claim 15 wherein the polygalactomannan gum is a benzoquinone ether adduct of polygalactomannan gum.

17. A thixotropic aqueous solution in accordance with claim 15 wherein the polygalactomannan gum is a benzoquinone ether adduct of guar gum.

18. A thixotropic aqueous solution in accordance with claim 15 wherein the polygalactomannan gum is a benzoquinone ether adduct of hydroxyalkyl ether of guar gum.

19. A thixotropic aqueous solution in accordance with claim 15 wherein the polygalactomannan gum is a benzoquinone ether adduct of carboxylalkyl ether of guar gum.

20. Benzoquinone ether adduct of polygalactomannan gum.

* * * * *